US012655968B2

(12) United States Patent
Cai

(10) Patent No.: US 12,655,968 B2
(45) Date of Patent: Jun. 16, 2026

(54) LED LIGHT STRING CONTROLLER, LED LIGHT STRING AND ARTIFICIAL CHRISTMAS TREE

(71) Applicant: Winners Group Industries Company Limited, Guigang City (CN)

(72) Inventor: Junhao Cai, Dongguan City (CN)

(73) Assignee: WINNERS GROUP INDUSTRIES COMPANY LIMITED, Guigang City (CN)

( * ) Notice: Subject to any disclaimer, the term of this patent is extended or adjusted under 35 U.S.C. 154(b) by 0 days.

(21) Appl. No.: 19/013,318

(22) Filed: Jan. 8, 2025

(65) Prior Publication Data

US 2026/0063287 A1 Mar. 5, 2026

(30) Foreign Application Priority Data

Sep. 3, 2024 (CN) ......................... 202422158828.1

(51) Int. Cl.
*F21V 23/00* (2015.01)
*F21S 4/10* (2016.01)
(Continued)

(52) U.S. Cl.
CPC .............. *F21V 23/008* (2013.01); *F21S 4/10* (2016.01); *F21V 23/001* (2013.01); (Continued)

(58) Field of Classification Search
CPC .... F21V 23/008; F21V 23/001; F21V 23/006; F21V 23/02; F21V 23/04; F21V 31/005; F21S 4/10; F21Y 2115/10
See application file for complete search history.

(56) References Cited

U.S. PATENT DOCUMENTS 12,133,311 B1 * 10/2024 Liu ...................... H05B 45/345
2014/0091719 A1 * 4/2014 Tsai ................... H05B 47/1965
315/185 S
(Continued)

FOREIGN PATENT DOCUMENTS

CN 201011425 Y 1/2008
CN 208143535 U 11/2018
CN 208353677 U 1/2019

*Primary Examiner* — Bao Q Truong

(74) *Attorney, Agent, or Firm* — MUNCY, GEISSLER, OLDS & LOWE, P.C.

(57) ABSTRACT

The present application discloses a light string controller, a light string and a Christmas tree. A light string controller, includes a housing provided with an accommodation space sealed inside, and an opening is provided on two opposite sides of the housing; a control circuit board provided in the accommodation space and provided with a power supply terminal and an output terminal; two wires, passing through two openings of the housing and connected to the power supply terminal and the output terminal of the control circuit board respectively; the power supply terminal is configured to be connected to the DC power supply through one wire of the two wires, the output terminal is configured to be connected to the light string through the other wire of the two wires, a power supply from the power supply terminal to the output terminal is controlled according to an output of high and low levels of the control circuit board.

8 Claims, 4 Drawing Sheets

(51) Int. Cl.

| | |
|---|---|
| ***F21V 23/02*** | (2006.01) |
| ***F21V 23/04*** | (2006.01) |
| ***F21V 31/00*** | (2006.01) |
| *F21Y 115/10* | (2016.01) |

(52) U.S. Cl.

CPC ............ *F21V 23/006* (2013.01); *F21V 23/02* (2013.01); *F21V 23/04* (2013.01); *F21V 31/005* (2013.01); *F21Y 2115/10* (2016.08)

(56) References Cited

U.S. PATENT DOCUMENTS

| | | | | |
|---|---|---|---|---|
| 2014/0320030 | A1* | 10/2014 | Chiang .............. | H05B 47/1965 315/185 R |
| 2015/0123551 | A1* | 5/2015 | Peng ...................... | H05B 45/40 315/192 |
| 2024/0283267 | A1* | 8/2024 | Gong ........................ | F21S 9/02 |

* cited by examiner

LED LIGHT STRING CONTROLLER, LED LIGHT STRING AND ARTIFICIAL CHRISTMAS TREE

CROSS-REFERENCE TO RELATED APPLICATION

This application claims priority to Chinese Patent Application No. CN202422158828.1 filed on Sep. 3, 2024, the entire content of which is hereby incorporated by reference.

FIELD OF TECHNOLOGY

The present application relates to the technical field of electronic control technology, and in particular to a light string controller, a light string and an artificial Christmas tree.

BACKGROUND

In life, people usually use a Christmas tree for decoration, such as in shopping malls and hotel lobbies. At the same time, in order to enhance a festive and joyful atmosphere, people also add decorations on the Christmas trees for ornament. Especially after artificial Christmas trees appeared, people can make Christmas trees with different stylings and hang light strings of different brightness and colors in different positions according to the shape of the Christmas tree. Then, the light strings can be controlled to be lighted up according to environmental conditions like indoor, outdoor, day and night. Thus a comfortable atmosphere is created and energy is saved.

However, setting different numbers of the light strings not only requires multiple power supplies, but also different light strings need to be controlled by different controllers, leading to a complex circuit to control the Christmas tree and making it inconvenient to control each light string.

SUMMARY

According to an aspect of this disclosure, a light string controller is disclosed.

A light string controller includes:

- a housing, wherein, an accommodation space sealed is provided inside the housing, an opening is provided on two opposite sides of the housing;
- a control circuit board provided inside the accommodation space, wherein, a power supply terminal and an output terminal are provided on the control circuit board;
- two wires, wherein, the two wires pass through two openings of the housing and are connected to the power supply terminal and the output terminal of the control circuit board;
- wherein, the power supply terminal is configured to be connected to a DC power supply though one wire of the two wires, the output terminal is configured to be connected to a light string through the other wire of the two wires, a power supply from the power supply terminal to the output terminal is controlled according to an output of high and low levels of the control circuit board.

According to a second aspect of this disclosure, a LED light string is disclosed.

A LED light string, includes: the LED light string and the light string controller; wherein, a power supply terminal of the light string controller is configured to be connected to the DC power supply, an output terminal of the light string controller is connected to the LED light string to drive the LED light string to be lighted up.

According to a third aspect of this disclosure, a Christmas tree is disclosed.

A Christmas tree includes:

- a tree body and a LED light string hung on the tree body;
- wherein, the LED light string includes the LED light string and the light string controller; the power supply terminal of the light string controller is configured to be connected the DC power supply, the output terminal of the light string controller is connected to the LED light string to drive the LED light string to be lighted up.

BRIEF DESCRIPTION

DETAILED DESCRIPTION

Figure 1:
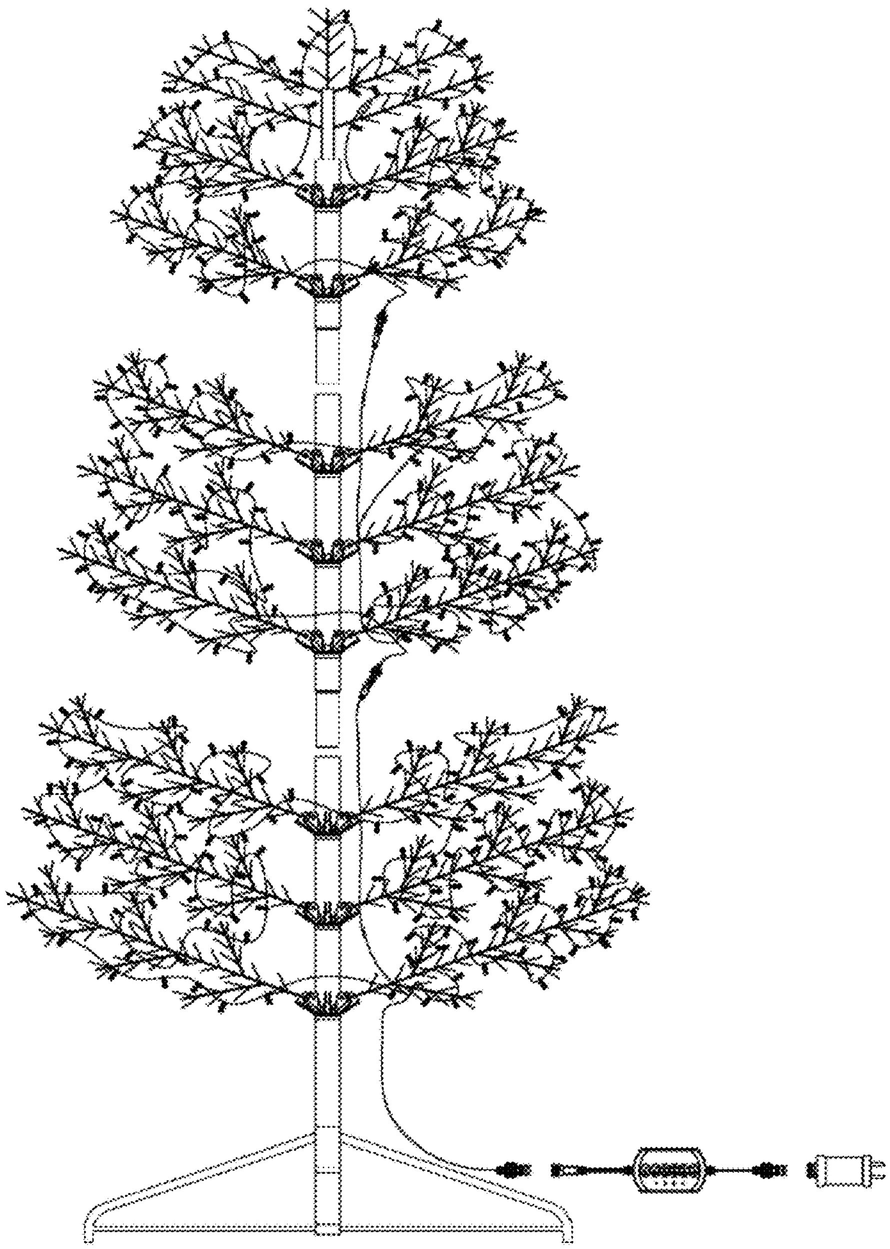
FIG. 1 is an overall schematic structure diagram of a Christmas tree of the present application.

In the description of the present application, it should be understood that, orientation or positional relationships indicated by the terms "center", "longitudinal", "lateral", "upper", "lower", "front", "back", "left", "right" "vertical", "horizontal", "top", "bottom", "inside", "outside", and the like are based on orientation or positional relationships shown in the drawings, which are only for conveniently describing the application and simplifying the description, rather than indicating or implying that the referred device or component must have a specific orientation, or be constructed and operated in a specific orientation, such that these terms cannot be understood as limitation of the application. In the description of the present application, "a plurality of"means two or more unless otherwise stated.

The present application enables a light string to be turned on and off/flash alternately etc. according to actual needs through an output of high and low levels of light string controller cooperated with a duty cycle to control the power supply of more than two light strings hung on a Christmas tree, thus simplifying a wiring of the light strings of the Christmas tree.

Particularly, please refer to FIG. 1. The Christmas tree of the present application includes a tree body 1, a LED light string 2 and a controller 3.

Wherein, the tree body 1 may include several shapes and structures of artificial Christmas trees of the prior art. For example, a plurality of branch bifurcations or one branch bifurcation, a plurality of tree trunks or one tree trunk, etc. are provided.

Figure 2:
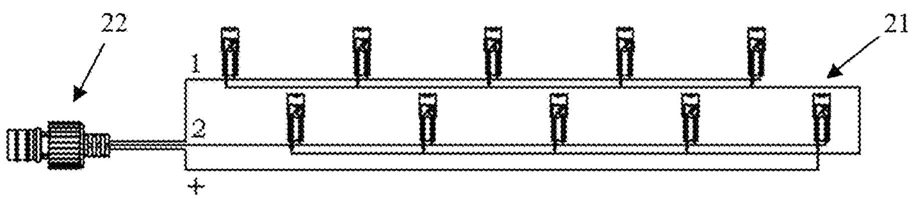
FIG. 2 is an overall schematic structure diagram of a light string provided with a single connector of the present application.
Figure 3:
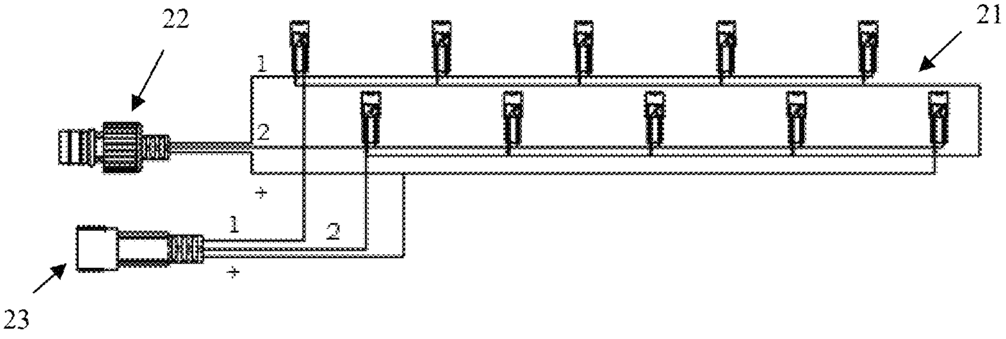
FIG. 3 is an overall schematic structure diagram of a light string provided with a double connector of the present application.

The LED light string 2 is wrapped around the tree body 1. The LED light string 2 includes a plurality of sub-light strings. The plurality of sub-light string are electrically connected with each other through a series circuit, a parallel circuit, a series and parallel circuit or a multi-circuit. Please refer to FIG. 2, in one embodiment, the LED light string 2 includes two sub-light strings 21 and a first electrical connector 22. A plurality of lamp bodies in a series connection is provided on each sub-light string of the two sub-light strings 21. The two sub-light strings 21 are connected to the first electrical connector 22 in parallel. The first electrical connector 22 is connected to the controller 3. Please refer to FIG. 3. In another embodiment, the LED light string 2 further includes a second electrical connector 23. The second electrical connector 23 is connected to the two sub-light strings 21 in parallel. When in use, a first electrical connector 22 of a first LED light string is connected to the controller 3, a second electrical connector 23 of the first LED light string is connected to a first electrical connector 22 of a second LED light string, a second electrical connector 23 of the second LED light string is connected to a first electrical connector 22 of a third LED light string, and so on a parallel connection between each of a plurality of LED light strings 2 is achieved, thus the number of the LED light string 2 hung on the tree body 1 is increased. In addition, the plurality of LED light string 2 may be electrically connected to each other through a series circuit, a parallel circuit, a series and parallel circuit or a multi-circuit in the prior art.

Figure 4:
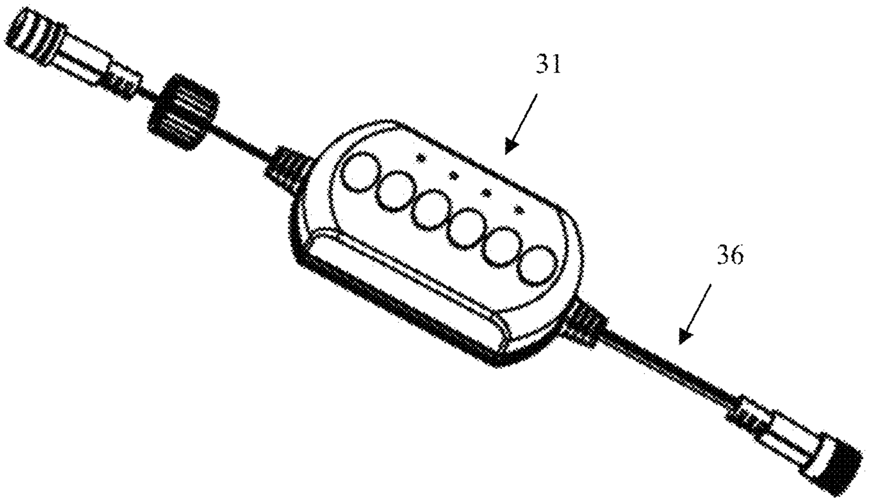
FIG. 4 is an overall schematic structure diagram of a controller of the present application.
Figure 5:
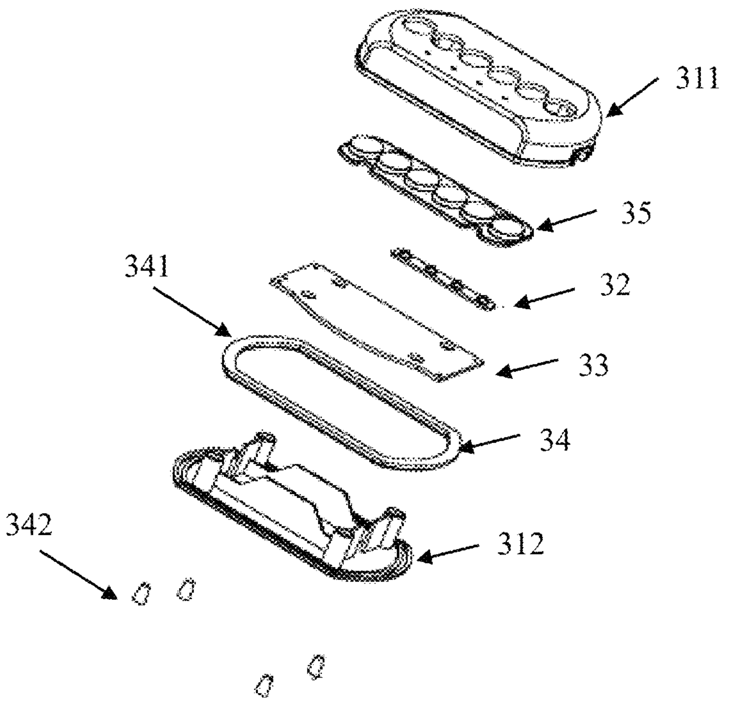
FIG. 5 is a partial structure exploded diagram of the controller of the present application.

Please refer to FIG. 4 and FIG. 5. The controller 3 includes a housing 31, a key sheet 32, a control circuit board 33, a sealing element 34, a keycap 35 and two wires 36. The housing 31 includes an upper housing 311 and a lower housing 312. The upper housing 311 is covered on the lower housing 312, forming an accommodation space sealed between the two. The key sheet 32 is electrically connected to the control circuit board 33 and located inside the accommodation space. An opening is provided on two opposite sides of the housing 31. The two wires 36 pass through the opening of the housing 31 and are connected to a power supply terminal and an output terminal of the control circuit board 33, respectively. Wherein, a wire 36 of the two wires 36 connected to the power supply terminal of the control circuit board 33 is connected to a DC power supply 100. The other wire 36 of the two wires 36 connected to the output terminal is connected to the first electrical connector 22 of the LED light string 2, achieving a power supply to the LED light string 2. A deck of the key sheet 32 faces the upper housing 311. The keycap 35 is provided near the key sheet 32 and penetrated out of the housing 31. When a user presses the keycap 35, a corresponding key position on the key sheet 32 is triggered, thus enabling the key sheet 32 to obtain a key signal and transmit the key signal to the control circuit board 33. In this embodiment, the upper housing 311 and the lower housing 312 are fixed to each other through screws. A screw hole is provided on one side of the lower housing 312 facing away from the upper housing 311. The sealing element 34 includes a sealing gasket 341 and a sealing plug 342. The sealing gasket 341 surrounds the upper housing 311 and the lower housing 312 to seal a junction between the upper housing 311 and the lower housing 312. The sealing plug 342 is inserted into the screw hole of the lower housing 312 and protrudes out to an outside of the lower housing 312. The lower housing 312 is separated from a ground etc. with a distance, thus achieving waterproof and reducing wear on the lower housing 312.

Figure 6:
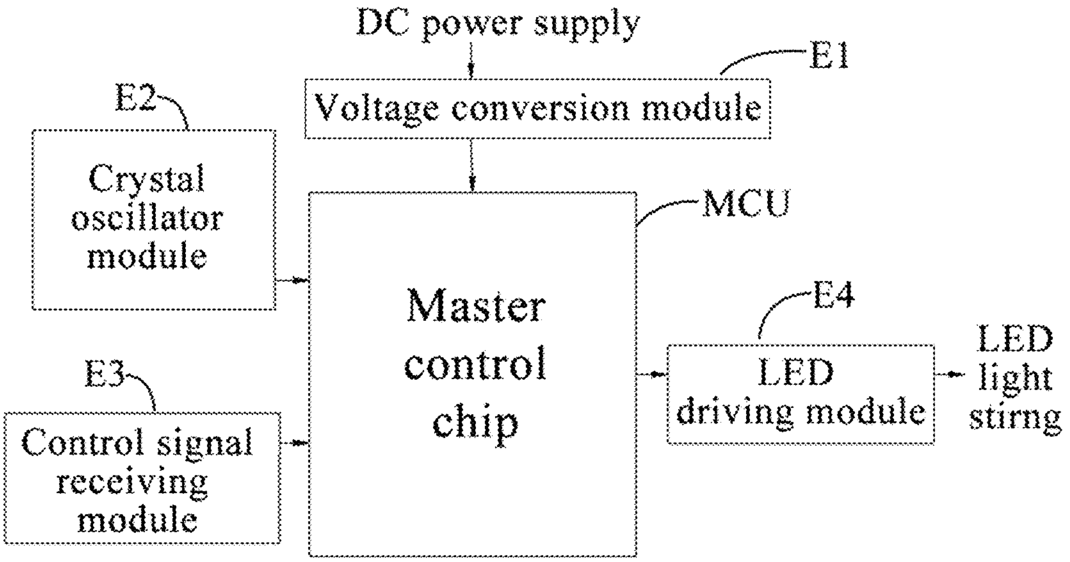
FIG. 6 is a schematic diagram of a circuit module of a control circuit board of the present application.

Please refer to FIG. 6. The control circuit board 33 is provided on an inner bottom surface of the lower housing 312 and is provided with a circuit. The circuit includes a master control chip MCU, a voltage conversion module E1, a crystal oscillator module E2, a control signal receiving module E3, and a LED driving module E4.

The master control chip MCU is configured to control the output of the high and low levels.

The voltage conversion module E1 is connected between the DC power supply 100 in an outside and a power supply terminal of the master control chip MCU to supply a stable low-voltage current to the master control chip MCU and other modules after reducing a voltage of the DC power supply 100.

The crystal oscillator module E2 is configured to form a crystal oscillation circuit and supply a clock signal required by an operation of the master control chip MCU.

The control signal receiving module E3 is configured to obtain a trigger signal of the user and control the LED driving module E4 to generate a level signal.

An input terminal of the LED driving module E4 is connected to a level signal output terminal of the master control chip MCU. An output terminal of the LED driving module E4 is connected to each LED light string 2. The LED driving module E4 drives the each LED light string 2 to be lighted up or off according to the level signal.

Figure 7:
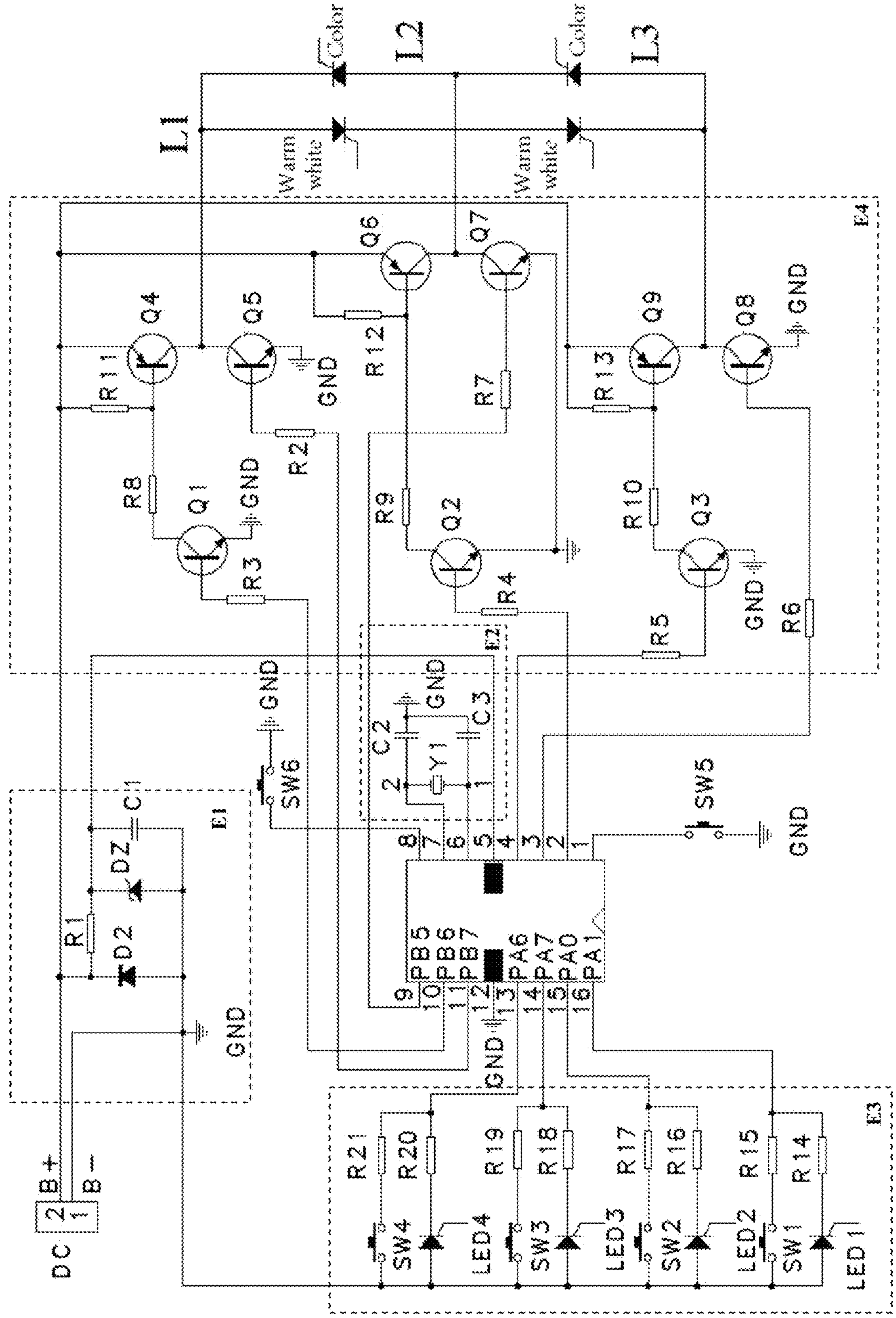
FIG. 7 is a schematic diagram of a circuit structure of the control circuit board of the present application.

In this embodiment, the master control chip MCU controls an on/off and an on/off duration of the LED light string 2 through controlling high and low levels of the LED driving module E4. Please refer to FIG. 7. The LED light string 2 includes a first light string L1 formed by a plurality of lamp bodies emitting warm white light connected to each other in series connection, a second light string L2 and a third light string L3 formed by a plurality of lamp bodies emitting colorful lights connected to each other in series connection. The second light string L2 is connected to the third light string L3 in series, then is connected to the first light string L1 in parallel, and is hung on different positions of the tree body 1 according to needs.

Particularly, the master control chip MCU is provided with 16 pins. Wherein, a fifth pin and a twelfth pin are power pins. The fifth pin is connected to the voltage conversion module E1, the twelfth pin is grounded. A sixth pin and a seventh pin are clock pins configured to connected to the crystal oscillator module E2. A first pin to a fourth pin, an eighth pin to an eleventh pin, a thirteenth pin to a sixteenth pin are I/O pins, wherein a second pin, a third pin, the fourth pin, a ninth pin, a tenth pin and the eleventh pin are configured to output the high and low levels ratio for controlling the high and low levels of the LED driving module E3. The first pin, the eighth pin and the thirteenth pin to the sixteenth pin are configured to be connected to the control signal receiving module E3 to input the key signal PWRKEY.

The voltage conversion module E1 includes a first resistor R1, a second diode D2, a zener diode DZ and a filter capacitor C1. An anode of the second diode D2, an anode of the zener diode DZ and one end of the filter capacitor C1 are sequentially connected in parallel and grounded. A cathode of the second diode D2, a cathode of the zener diode DZ and the other end of the filter capacitor C1 are sequentially connected in parallel. The cathode of the second diode D2 is connected to the DC power supply 100, and the other end of the filter capacitor C1 is connected to the fifth pin. A current of the DC power supply 100 flows from the second diode D2 to the filter capacitor C1. The first resistor R1 is connected between the cathode of the second diode D2 and the cathode of the zener diode DZ. Under a voltage-reducing and a current-limiting effect of the first resistor R1, a first voltage V1 output from the DC power supply 100 is reduced to a second voltage V2. Then, under an effect of the zener diode DZ, the filter capacitor C1 obtains a stable voltage and supplies power to the master control chip MCU. A specific voltage value of the DC power supply 100 is between 3V~36V. Specific voltage values of the first voltage V1 and the second voltage V2 are set according to actual needs. In this embodiment, the first voltage V1 is 29V, the second voltage V2 is 4.7V.

The crystal oscillator module E2 includes a crystal oscillator Y1, a second capacitor C2 and a third capacitor C3. Both ends of the crystal oscillator Y1 are connected to the sixth pin and the seventh pin, respectively. One end of the second capacitor C2 is connected to a second end of the crystal oscillator Y1, and the other end of the second capacitor C2 is grounded. One end of the third capacitor C3 is connected to a first end of the crystal oscillator Y1, and the other end of the third capacitor C3 is grounded. Values of the second capacitor C2 and the third capacitor C3 are set, and the crystal oscillator Y1 is activated through the second capacitor C2 and the third capacitor C3, achieving a timing function with different times such as four hours, six hours, eight hours and ten hours, etc.

The control signal receiving module E3 includes a key control unit connected to the master control chip MCU. The key control unit is connected to a button of the key sheet 32. When buttons with different functions are triggered by the user, the key control unit obtains and outputs a corresponding key signal PWRKEY to the master control chip MCU. According the key signal PWRKEY, corresponding pins of the master control chip MCU output different level signals. In addition, the control signal receiving module E3 may further includes a remote control unit. The remote control unit receives a remote control signal based on a radio wave that is generated through an operation on a remote controller by the user, and outputs the remote control signal to the master control chip MCU. The master control chip MCU generates level signals configured to control the LED driving module E4 according to the remote control signal.

Wherein, in this embodiment, six function buttons are provided on the key sheet 32. Correspondingly, the control signal receiving module E3 includes a first key control unit, a second key control unit, a third key control unit, a fourth key control unit, a fifth key control unit and a sixth key control unit.

The first key control unit includes a first switch SW1, a fourteenth resistor R14, a fifteenth resistor R15 and a first indicator light LED1. One end of the fourteenth resistor R14 and one end of the fifteenth resistors R15 are connected to the sixteenth pin in parallel. A cathode of the first indicator light LED1 is connected to the other end of the fourteenth resistor R14. One end of the first switch SW1 is connected to the other end of the fifteenth resistors R15. The other end of the first switch SW1 is connected in parallel to an anode of the first indicator light LED1 and grounded. Pressing a corresponding function button may turn on or off the first switch SW1, triggering a signal that keeps the light string in a constant lighting state.

The second key control unit includes a second switch SW2, a seventeenth resistor R17, a sixteenth resistor R16 and a second indicator light LED2. One end of the seventeenth resistor R17 and one end of the sixteenth resistor R16 are connected to a fifteenth pin in parallel. A cathode of the second indicator light LED2 is connected to the other end of the sixteenth resistor R16. One end of the second switch SW2 is connected to the other end of the seventeenth resistor R17. The other end of the second switch SW2 is connected to an anode of the second indicator light LED2 in parallel and grounded. Pressing a corresponding function button may turn on or off the second switch SW2, triggering a signal that keeps at least one light string in a constant lighting state and another light string in a flashing state.

The third key control unit includes a third switch SW3, a nineteenth resistor R19, an eighteenth resistor R18 and a third indicator light LED3. One end of the nineteenth resistor R19 and one end of the eighteenth resistor R18 are connected to a fourteenth pin in parallel. A cathode of the third indicator light LED3 is connected to the other end of the eighteenth resistor R18. One end of the third switch SW3 is connected to the other end of the nineteenth resistor R19. The other end of the third switch SW3 is connected to an anode of the third indicator light LED3 in parallel and grounded. Pressing a corresponding function button may turn on or off the third switch SW3, triggering a signal that causes at least two light strings to flash sequentially along one direction.

The fourth key control unit includes a fourth switch SW4, a twenty-first resistor R21, a twentieth resistor R20 and a fourth indicator light LED4. One end of the twentieth resistor R20 and one end of the twentieth resistor R20 are connected to the thirteenth pin in parallel. A cathode of the fourth indicator light LED4 is connected to the other end of the twentieth resistor R20. One end of the fourth switch SW4 is connected to the other end of the twenty-first resistor R21. The other end of the fourth switch SW4 is connected to an anode of the fourth indicator light LED4 in parallel and grounded. Pressing a corresponding function button may turn on or off the fourth switch SW4, triggering a signal that causes at least two light strings to flash alternatively.

The fifth key control unit includes a fifth switch SW5. One end of the fifth switch SW5 is connected to the first pin, and the other end of the fifth switch SW5 is grounded. Pressing a corresponding function button may turn on or off the fifth switch SW5, triggering a signal that causes all light strings to be switched on or off.

The sixth key control unit includes a sixth switch SW6. One end of the sixth switch SW6 is connected to the eighth pin, and the other end of the sixth switch SW6 is grounded. Pressing a corresponding function button may turn on or off the sixth switch SW6, triggering a signal of timing switch of all light strings.

The LED driving module E4 includes a first driving module, a second driving module and a third driving module.

The first driving module includes a first triode Q1, a fourth triode Q4, a fifth triode Q5, a second resistor R2, a third resistor R3, an eighth resistor R8 and an eleventh resistor R11. One end of the second resistor R2 is connected to the eleventh pin, and the other end of the second resistor R2 is connected to a base electrode of the fifth triode Q5. An emitter electrode of the fifth triode Q5 is grounded. One end of the eighth resistor R8 is connected to the tenth pin, the other end of the eighth resistor R8 is connected to a base electrode of the fourth triode Q4. An emitter electrode of the fourth triode Q4 is connected to the DC power supply 100. A collector of the fifth triode Q5 and a collector of the fourth triode Q4 are connected together to first ends of the first light string L1 and the second light string L2 in parallel. The eleventh resistor R11 is connected between a base electrode and an emitter electrode of the fourth triode Q4 to modulate the fourth triode Q4. Furthermore, the third resistor R3 is connected between the tenth pin and a base electrode of the first triode Q1. An emitter electrode of the first triode Q1 is grounded, a collector of the first triode Q1 is connected to the eighth resistor R8 to amplify current to drive on or off of the fourth triode Q4.

The second driving module includes a second triode Q2, a seventh triode Q7, a sixth triode Q6, a fourth resistor R4, a seventh resistor R7, a ninth resistor R9 and a twelfth resistor R12. One end of the seventh resistor R7 is connected to the ninth pin, the other end of the seventh resistor R7 is connected to a base electrode of the seventh triode Q7. An emitter electrode of the seventh triode Q7 is grounded. One end of the ninth resistor R9 is connected to the second pin, the other end of the ninth resistor R9 is connected to a base electrode of the sixth triode Q6. An emitter electrode of the sixth triode Q6 is connected to the DC power supply 100. A collector of the seventh triode Q7 and a collector of the sixth triode Q6 are connected in parallel together to a second end of the second light string L2 and a first end of the third light string L3. The twelfth resistor R12 is connected between the base electrode and the emitter electrode of the sixth triode Q6 to modulate the sixth triode Q6. Furthermore, the fourth resistor R4 is connected between the second pin and a base electrode of the second triode Q2. An emitter electrode of the second triode Q2 is grounded. A collector of the second triode Q2 is connected to ninth resistor R9 to amplify current to drive on or off of the sixth triode Q6.

The third driving module 43 includes a third triode Q3, an eighth triode Q8, a ninth triode Q9, a fifth resistor R5, a sixth resistor R6, an eighth resistor R8, a tenth resistor R10 and a thirteenth resistor R13. One end of the sixth resistor R6 is connected to the third pin, the other end of the sixth resistor R6 is connected to a base electrode of the eighth triode Q8. An emitter of the eighth triode Q8 is grounded. One end of the tenth resistor R10 is connected to the fourth pin, the other end of the tenth resistor R10 is connected to a base electrode of the ninth triode Q9. An emitter electrode of the ninth triode Q9 is connected to the DC power supply 100. A collector of the eighth triode Q8 and a collector of the ninth triode Q9 are connected together to second ends of the first light string L1 and the third light string L3 in parallel. The thirteenth resistor R13 is connected between the base electrode and the emitter electrode of the ninth triode Q9 to modulate the ninth triode Q9. Furthermore, the fifth resistor R5 is connected between the fourth pin and a base electrode of the third triode Q3. An emitter electrode of the third triode Q3 is grounded. A collector of the third triode Q3 is connected to the tenth resistor R10 to amplify current to drive on or off of the ninth triode Q9.

In a circuit of the LED driving module E4, the master control chip MCU outputs a high level to the base electrode of the fifth triode Q5, and the fifth triode Q5 is turned on. The master control chip MCU outputs a low level to the emitter electrode of the fifth triode Q5, and the fifth triode Q5 is turned off. The master control chip MCU outputs a low level to the base electrode of the fourth triode Q4, and the fourth triode Q4 is turned on. The master control chip MCU outputs a high level to the emitter electrode of the fourth triode Q4, and the fourth triode Q4 is turned off. The master control chip MCU outputs a high level to the base electrode of the seventh triode Q7, and the seventh triode Q7 is turned on. The master control chip MCU outputs a low level to the emitter electrode of the seventh triode Q7, and the seventh triode Q7 is turned off. The master control chip MCU outputs a low level to the base electrode of the sixth triode Q6, and the sixth triode Q6 is turned on. The master control chip MCU outputs a high level to the emitter electrode of the sixth triode Q6, and the sixth triode Q6 is turned off. The master control chip MCU outputs a high level to the base electrode of the eighth triode Q8, and the eighth triode Q8 is turned on. The master control chip MCU outputs a low level to the emitter electrode of the eighth triode Q8, and the eighth triode Q8 is turned off. The master control chip MCU outputs a low level to the base electrode of the ninth triode Q9, and the ninth triode Q9 is turned on. The master control chip MCU outputs a high level to the emitter electrode of the ninth triode Q9, and the ninth triode Q9 is turned off. The high and low levels controlled by the master control chip MCU is cooperated with a duty cycle, lighting effects are achieved but not limited to the following embodiments:

The master control chip MCU controls the output of the high and low levels, the fourth triode Q4 is turned on, the eighth triode Q8 is turned on, the first light string L1, the second light string L2 and the third light string L3 are lighted up.

The master control chip MCU controls the output of the high and low levels, the fourth triode Q4 is turned on, the seventh triode Q7 is turned on, the second light string L2 is lighted up.

The master control chip MCU controls the output of the high and low levels, the sixth triode Q6 is turned on, the eighth triode Q8 is turned on, the third light string L3 is lighted up.

By controlling a duty cycle output through each pin, durations of alternating lighted off or up of the first light string L1, the second light string L2 the third light string L3 are controlled, thus achieving a flashing effect.

In addition, in this embodiment, a chip model of the master control chip MCU is PMC156_16. A model of the first triode Q1, the second triode Q2 and the third triode Q3 is 2N3904. A model of the fourth triode Q4, the sixth triode Q6 and the ninth triode Q9 is B772. A model of the fifth triode Q5, the seventh triode Q7 and the eighth triode Q8 is D882. Other specific parameters of capacitance and resistance can be adjusted by those skilled in the art, and are not limited in the present application.

Compared with the prior art, the light string controller, light string and Christmas tree of the present application have following advantages:

1. The light string controller is separated from the LED light string, and is connected to the LED light string when in use. When setting up the Christmas tree, the user may wind up a plurality of LED light strings on the Christmas tree and connected them sequentially. Then, the LED light string is connected to the light string controller, thus improving a convenience of installation.
2. A single light string controller controls a plurality of LED light strings at the same time, simplifying a controlling circuit and improving a convenience of controlling the LED light string to be lighted up.
3. The user can control the LED light string to be lighted up through multiple methods such as pressing button and remote controller etc. By cooperating with the duty cycle of the high and low levels, a combination of different LED light strings with a variety of luminous effects is achieved, and a variety of atmospheres is created.
4. A timing function is provided, the number of the switch of the LED light string may be automatically selected according to time and ambient brightness, which is energy saving and environmental friendly.

The above-mentioned embodiments only express several implementation modes of the present application, and the description is relatively specific and detailed, but should not be understood as limiting the scope of the present application. It should be noted that, for those of skill in the art, several variations and improvements may be made without departing from the concept of the present application, then the present application intends to include these modifications and variations.

What is claimed:

1. A light string controller, comprising:

a housing, wherein, an accommodation space sealed is provided inside the housing, an opening is provided on two opposite sides of the housing;

a control circuit board provided inside the accommodation space, wherein, a power supply terminal and an output terminal are provided on the control circuit board;

two wires, wherein, the two wires pass through two openings of the housing and are connected to the power supply terminal and the output terminal of the control circuit board;

wherein, the power supply terminal is configured to be connected to a DC power supply though one wire of the two wires, the output terminal is configured to be connected to a light string through the other wire of the two wires, a power supply from the power supply terminal to the output terminal is controlled according to an output of high and low levels of the control circuit board;

wherein a circuit is provided on the control circuit board, the circuit includes:

a master control chip configured to output high and low levels; a voltage conversion module connected to a power supply terminal of the master control chip, wherein the voltage conversion module is configured to be connected to the DC power supply and supply power to the master control chip, a control signal receiving module connected to an input terminal of the master control chip, wherein the control signal receiving module is configured to obtain and transmit a trigger signal to the master control chip, an LED driving module connected to an output terminal of the master control chip, wherein the LED driving module is configured to control a power supply to the light string according to an output of the high and low levels of the master control chip;

the light string controller further comprising a key sheet and a keycap, the key sheet is located at the accommodation space and electrically connected to the control circuit board, the keycap is provided near a button of the key sheet and passes through the housing; the key sheet is electrically connected to the control circuit board; the key sheet obtains a key signal generated when the button of the key sheet is pressed, and transmits the key signal to the control circuit board;

the control signal receiving module includes a key control unit connected to the button of the key sheet, wherein the key control unit is configured to obtain and transmit the key signal to the master control chip.

2. The light string controller of claim 1, wherein, the circuit further includes a crystal oscillator module configured to form a crystal oscillator circuit, wherein the crystal oscillator circuit supplies a clock signal required by an operation of the master control chip.

3. The light string controller of claim 2, wherein, the LED driving module includes a first driving module and a third driving module;

the first driving module includes a first triode, a fourth triode, a fifth triode, a second resistor, a third resistor, an eighth resistor and an eleventh resistor; one end of the second resistor is connected to a corresponding output pin of the master control chip, the other end of the second resistor is connected to a base electrode of the fifth triode, an emitter electrode of the fifth triode is grounded; one end of the third resistor is connected to a corresponding output pin of the master control chip, the other end of the third resistor is connected to a base electrode of the first triode, an emitter electrode of the first triode is grounded, a collector of the first triode is connected to one end of the eighth resistor, the other end of the eighth resistor is connected to a base electrode of the fourth triode, an emitter electrode of the fourth triode is configured to be connected to the DC power supply; collectors of the fifth triode and the fourth triode are configured to be connected together to a first end of a first light string of a LED light string in parallel, the eleventh resistor is connected between the base electrode and the emitter electrode of the fourth triode;

the third driving module includes a third triode, an eighth triode, a ninth triode, a fifth resistor, a sixth resistor, an eighth resistor, a tenth resistor and a thirteenth resistor; one end of the sixth resistor is connected to a corresponding output pin of the master control chip, the other end of the sixth resistor is connected to a base electrode of the eighth triode, an emitter electrode of the eighth triode is grounded; the fifth resistor is connected between a corresponding output pin of the master control chip and a base electrode of the third triode, an emitter electrode of the third triode is grounded, a collector of the third electrode is connected to one end of the tenth resistor, the other end of the tenth resistor is connected to a base electrode of the ninth triode, an emitter electrode of the ninth triode is configured to be connected to the DC power supply; collectors of the eighth triode and the ninth triode are configured to connected together to a second end of the first light string in parallel; the thirteenth resistor is connected between the base electrode and the emitter electrode of the ninth triode.

4. The light string controller of claim 3, wherein, the LED driving module further includes a second driving module, the second driving module includes a second triode, a seventh triode, a sixth triode, a fourth resistor, a seventh resistor, a ninth resistor and a twelfth resistor; one end of the seventh resistor is connected to a corresponding output pin of the master control chip, the other end of the seventh resistor is connected to a base electrode of the seventh triode, an emitter electrode of the seventh triode is grounded; the fourth resistor is connected between a corresponding output pin of the master control chip and a base electrode of the second triode, an emitter electrode of the second triode is grounded, a collector of the second triode is connected to one end of the ninth resistor, the other end of the ninth resistor is connected to a base electrode of the sixth triode, an emitter electrode of the sixth triode is configured to be connected to the DC power supply; collectors of the seventh triode and the sixth triode are configured to a second end of a second light string and a first end of a third light string of the LED light string in parallel; the eleventh resistor is connected between the base electrode and the emitter electrode of the sixth triode; a first end of the second light string is connected to collectors of the fifth triode and the fourth triode; a second end of the third light string is connected to collectors of the eighth triode and the ninth triode.

5. The light string controller of claim 4, wherein, the voltage conversion module includes a first resistor, a second diode, a zener diode and a filter capacitor, an anode of the second diode, an anode of the zener diode and one end of the filter capacitor are sequentially connected in parallel and grounded, a cathode of the second diode, a cathode of the zener diode and the other end of the filter capacitor are sequentially connected in parallel, the cathode of the second diode is configured to be connected to the DC power supply, and the other end of the filter capacitor is connected to a corresponding output pin of the master control chip and enables a current of the DC power supply flows from the second diode to the filter capacitor; the first resistor is connected between the second diode and the cathode of the zener diode.

6. The light string controller of claim 5, wherein the crystal oscillator module includes a crystal oscillator, a second capacitor and a third capacitor, both ends of the crystal oscillator are connected to corresponding output pins of the master control chip respectively; one end of the second capacitor is connected to a second end of the crystal oscillator, the other end of the second capacitor is grounded; one end of the third capacitor is connected to a first end of the crystal oscillator, the other end of the third capacitor is grounded.

7. A LED light string, comprising: the LED light string and the light string controller of claim 1; wherein, a power supply terminal of the light string controller is configured to be connected to the DC power supply, an output terminal of the light string controller is connected to the LED light string to drive the LED light string to be lighted up.

8. A Christmas tree, comprising:

a tree body and a LED light string hung on the tree body;

wherein, the LED light string includes the LED light string and the light string controller of claim 1; the power supply terminal of the light string controller is configured to be connected to the DC power supply, the output terminal of the light string controller is connected to the LED light string to drive the LED light string to be lighted up.

* * * * *